(12) United States Patent (10) Patent No.: US 8,665,470 B2
Maeshima et al. (45) Date of Patent: Mar. 4, 2014

(54) METHOD OF DISPLAYING EXPECTED SERVICE LIFE VALUES COLLECTED BY REPLACEABLE UNIT IN AN ELECTRONIC DEVICE, AND A DISPLAY PROGRAM

(75) Inventors: Hidetoshi Maeshima, Nagano-ken (JP); Manabu Yokota, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1030 days.

(21) Appl. No.: 12/710,644

(22) Filed: Feb. 23, 2010

(65) Prior Publication Data

US 2010/0214608 A1 Aug. 26, 2010

(30) Foreign Application Priority Data

Feb. 25, 2009 (JP) ................. 2009-042616

(51) Int. Cl.
*G06F 3/12* (2006.01)
*H04N 1/32* (2006.01)
(52) U.S. Cl.
USPC .......................... 358/1.15; 358/1.16; 358/472
(58) Field of Classification Search
USPC ............ 358/1.1, 1.4, 1.5, 1.6, 1.9, 1.11, 1.12, 358/1.13, 1.14, 1.15, 1.16, 1.17, 1.18, 472
See application file for complete search history.

(56) References Cited

U.S. PATENT DOCUMENTS

| | | | |
|---|---|---|---|
| 7,607,748 B2 | 10/2009 | Nishizaka et al. | |
| 8,147,021 B2 | 4/2012 | Nishizaka et al. | |
| 8,152,263 B2 | 4/2012 | Nishizaka et al. | |

FOREIGN PATENT DOCUMENTS

| | | | |
|---|---|---|---|
| JP | 09-259443 | | 10/1997 |
| JP | 11-096589 | | 4/1999 |
| JP | 11-232835 | A | 8/1999 |
| JP | 11232835 | A * | 8/1999 |
| JP | 2001-101696 | A | 4/2001 |
| JP | 2001-126369 | A | 5/2001 |
| JP | 2002-072785 | A | 3/2002 |
| JP | 2002-187259 | A | 7/2002 |
| JP | 2004-335030 | A | 11/2004 |
| JP | 2005-243089 | | 9/2005 |
| JP | 2006-018955 | A | 1/2006 |
| JP | 2006018955 | A * | 1/2006 |
| JP | 2007-245501 | A | 9/2007 |
| JP | 2008-097460 | | 4/2008 |
| JP | 2008-146768 | | 6/2008 |
| JP | 2009-003980 | A | 1/2009 |

* cited by examiner

*Primary Examiner* — Thierry L Pham (57) ABSTRACT

The user of an electronic device can easily know when a replaceable unit needs replacing (the service life). A host computer 100 connected to a media processing device 1 (electronic device) executes a step (S4) of acquiring maintenance counter information that is stored in the media processing device 1, steps (S5, S7) of calculating based on the acquired maintenance counter information A=(the total open/close count of the media tray of the media drive 41 (51))/(an assured media tray open/close count), B=(the cumulative CD writing time of the media drive 41 (51)/(the assured CD writing time), and C=(the cumulative DVD writing time) of the media drive 41 (51)/(the assured DVD writing time), and steps (S6, S8) of displaying the maximum value of values A, B, and C as the expected service life of the media drive 41 (51) on a display unit.

6 Claims, 7 Drawing Sheets

```
┌─────────────────────────────────────────────────┐
│                                              ☒  │
│  ┌ MAINTENANCE COUNTER INFORMATION ────────┐    │
│  │                                          │    │
│  │  PRODUCT SERIAL NUMBER        XXXXXXX   │    │
│  │  TOTAL PRINT COUNT               2000   │    │
│  │  EXPECTED SERVICE LIFE OF FIRST DRIVE  20% │ │
│  │  EXPECTED SERVICE LIFE OF SECOND DRIVE 15% │ │
│  └──────────────────────────────────────────┘    │
│                                                  │
│   ┌────────┐              ┌────────┐ ┌────────┐ │
│   │  SAVE  │              │ UPDATE │ │ CANCEL │ │
│   └────────┘              └────────┘ └────────┘ │
└─────────────────────────────────────────────────┘
```

FIG. 7

METHOD OF DISPLAYING EXPECTED SERVICE LIFE VALUES COLLECTED BY REPLACEABLE UNIT IN AN ELECTRONIC DEVICE, AND A DISPLAY PROGRAM

CROSS-REFERENCE TO RELATED APPLICATION(S)

Japanese Patent application No. 2009-042616 is hereby incorporated by reference in its entirety.

BACKGROUND

1. Field of Invention

The present invention relates to a method of displaying expected service life values collected for replaceable units in an electronic device, and a display program for the same.

2. Description of Related Art

Media processing devices that can write data and print labels on large numbers of media are now used as a type of electronic device that has a plurality of media drives for writing and reading data on media (information recording media) such as CD (Compact Disc), DVD (Digital Versatile Disc), and BD (Blu-ray Disc) media. Media processing devices of this type that have a media stacker (media storage unit) for storing such disc-shaped media in a stack, a media drive for recording data on the media and a label printer for printing on the label side of the media (media processing units), and a media transportation mechanism for holding and conveying the media to the media processing units, are known from the literature.

Printers and photocopiers, for example, also typically have maintenance counters for monitoring the usage frequency of parts that wear out over time, such as the print head and paper feed rollers, and determining the service life of such members.

Japanese Unexamined Patent Appl. Pub. JP-A-2008-97460 (page 11) also teaches a media processing device such as described above that has a maintenance counter storage area for storing maintenance counter information specific to the media processing device reserved in a nonvolatile storage unit, and stores information specific to the media processing device, such as the operating time, the number of times movable parts inside the media processing device operate, the number of discs produced, and the number of times each drive writes data, as maintenance counter information.

This maintenance counter information is, however, not displayed to the user of the electronic device (media processing device). In addition, even if the values of the foregoing operating time, the number of times movable parts inside the media processing device operate, the number of discs produced, and the number of times each drive writes data, are displayed for the user, it is difficult for the user to know when it is time to replace a particular unit (such as the media drive or label printer), that is, when the end of the service life of a replaceable unit is reached.

SUMMARY OF INVENTION

A method of displaying expected service life values compiled for individual replacement units of an electronic device, and a display program for the same, according to the present invention enable the user of an electronic device to easily know the replacement time (the end of the service life) of individually replaceable units incorporated in the electronic device.

A first aspect of the invention is an expected service life value display method for displaying an expected service life value for each replaceable unit in an electronic device having at least a media drive as a replaceable unit, including as steps executed by a host computer connected to the electronic device steps of: acquiring maintenance counter information that is stored in the electronic device and includes a cumulative usage time related to a head of the media drive used with media of a specific type; calculating the (cumulative usage time)/(assured time) as the expected service life value for each head based on the acquired maintenance counter information and an assured time that is preset for each head used with media of the specific type; and displaying the maximum value of the expected service life values calculated for the heads on a display unit as the expected service life of the media drive.

Because expected service life values compiled for each replaceable unit of the electronic device are displayed on a display unit with this method of displaying expected service life values, the user can easily know approximately when each replaceable unit must be replaced (the end of the service life) by referring to the service life values displayed on the display unit.

Preferably, the maintenance counter information includes a cumulative opening/closing count for a media tray of the media drive, and the display method further includes as steps executed by the host computer steps of: calculating the (cumulative count)/(assured time) as the expected service life value for opening and closing the media tray based on the acquired maintenance counter information and an assured time that is preset for opening and closing the media tray; and displaying the maximum value of the expected service life values calculated for the heads and the expected service life value for opening and closing the media tray on a display unit as the expected service life of the media drive.

The expected service life value display method according to this aspect of the invention enables knowing approximately when each replaceable unit must be replaced (the end of the service life) by also considering the wear of mechanical parts as an indicator of the service life of the media drive.

Further preferably, there are plural media drives, and the host computer additionally executes steps of acquiring expected service life values for each of the plural media drives, and displaying the expected service life value for each media drive on the display unit.

The expected service life value display method according to this aspect of the invention enables knowing for each of the plural media drives approximately when each replaceable unit must be replaced (the end of the service life).

Yet further preferably, the electronic device is a media processing device additionally having a label printer that is a replaceable unit, a media storage unit that stores the media; and a media transportation mechanism that can convey the media to the media drive, the label printer, and the media storage unit; the maintenance counter information includes a total print count of the label printer; and the host computer additionally executes a step of displaying the total print count on the display unit.

The expected service life value display method according to this aspect of the invention enables knowing approximately when the label printer must be replaced (the end of the service life) by referring to the total print count of the label printer displayed on the display unit, and the maximum print count at which printer durability is assured printed in the product manual, for example.

Yet further preferably, the electronic device is a media processing device additionally having a label printer that is a replaceable unit, a media storage unit that stores the media; and a media transportation mechanism that can convey the media to the media drive, the label printer, and the media storage unit; the maintenance counter information includes a total print count of the label printer; and the host computer additionally executes a step of displaying (the total print count)/(a maximum print count to which printer durability is assured) as the expected service life value of the label printer on the display unit.

The expected service life value display method according to this aspect of the invention enables knowing approximately when the label printer must be replaced (the end of the service life) by referring to the expected service life value of the label printer displayed on the display unit.

Yet further preferably, the media of a specific type is a CD, DVD, or BD medium.

The expected service life value display method according to this aspect of the invention enables using the maximum value of the expected service life values determined for each of the heads that are used for media of any CD, DVD, or BD media type, that is, the expected service life value of the head that reaches the end of its service life first, to indicate approximately when the media drive must be replaced (the end of the service life).

Another aspect of the invention is a program for displaying an expected service life value that causes the host computer to execute the steps of the expected service life value display method described herein.

Because expected service life values compiled for each replaceable unit of the electronic device are displayed on a display unit with this program for displaying expected service life values, the user can easily know approximately when each replaceable unit must be replaced (the end of the service life) by referring to the service life values displayed on the display unit.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A method of displaying expected service life values separately compiled for individual replacement units in an electronic device, and a display program for the same, according to the present invention are described below with reference to the accompanying figures using a media processing device as an example of an electronic device below.

Figure 1:
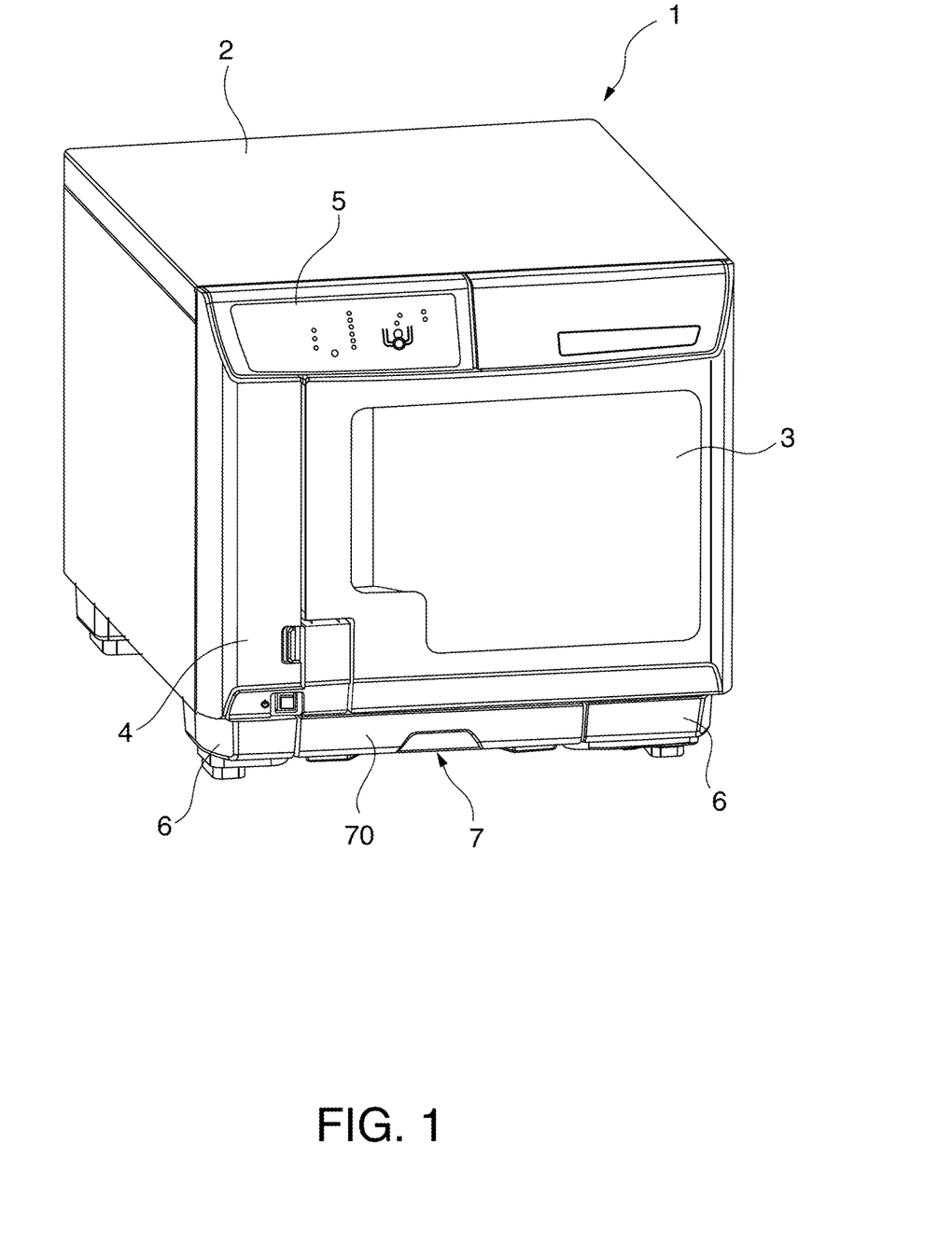
FIG. 1 is an external oblique view of a media processing device when the units thereof are closed.

The general configuration of a media processing device used in this embodiment of the invention is described below with reference to FIG. 1 to FIG. 3. FIG. 1 is an external oblique view of the media processing device when the units thereof are closed, FIG. 2 is an external oblique view of the media processing device when the units thereof are open, and FIG. 3 is an oblique view from the top front side of the media processing device with the case removed.

As shown in FIG. 1, the media processing device 1 is a device that writes data and prints on the label side of disc-shaped media such as CDs, DVDs, and BD discs, and has a basically rectangular box-shaped case 2. Doors 3 and 4 that open and close are attached at the front of the case 2. An operating panel 5 having various indicators and operating buttons is disposed at the top left part of the case 2. Support legs 6 project down from the bottom of the case 2 on both right and left sides. A drawer mechanism 7 is disposed between the right and left legs 6.

Figure 2:
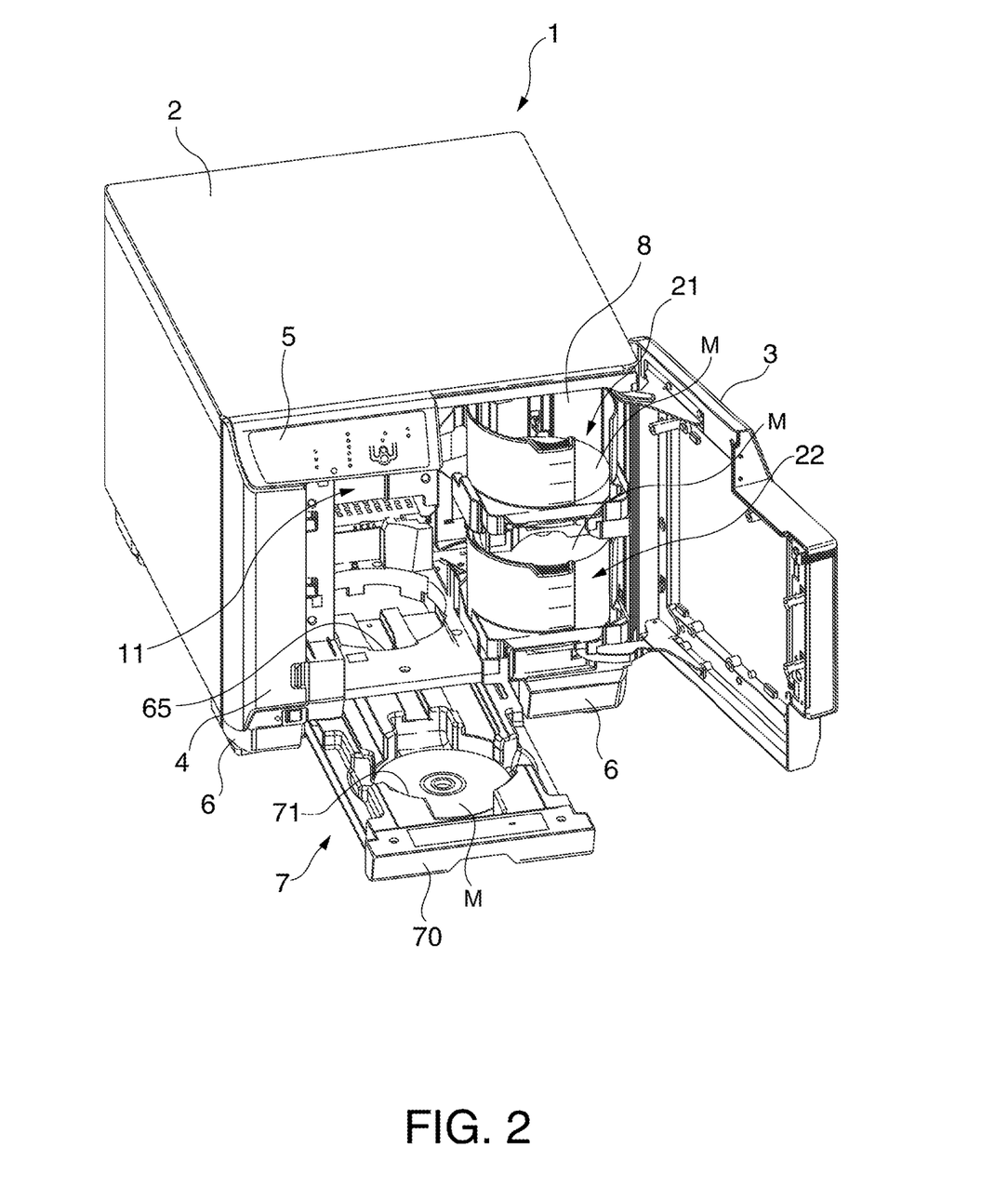
FIG. 2 is an external oblique view of the media processing device when the units thereof are open.
Figure 3:
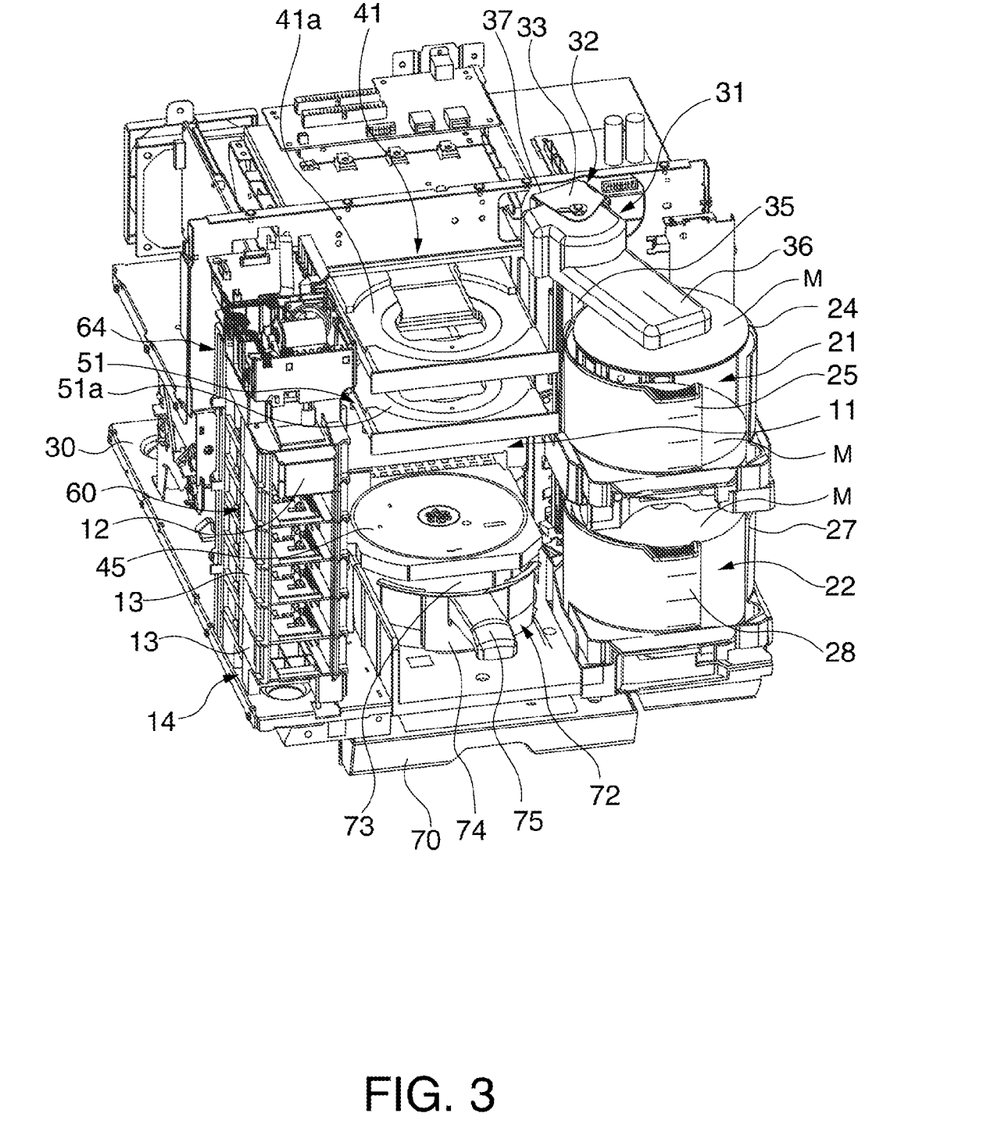
FIG. 3 is an oblique view from the top front side of the media processing device with the case removed.

As shown in FIG. 2 and FIG. 3, a media stacker 21 used as a media storage unit for holding a plurality of unused discs M (such as 50) to which data has not been written, and a media stacker 22 used as a media storage unit for holding a plurality (such as 50) of completed discs M, are disposed one above the other inside the case 2 of the media processing device 1 so that the center axes of the media M stored therein are the same. Media stacker 21 and media stacker 22 can be freely installed to and removed from their respective positions.

The top media stacker 21 has a pair of right and left curved side walls 24 and 25. As a result, the blank discs M can be received from the top and the media M can be stored in a coaxial stack. The task of storing or loading media M into the media stacker 21 can be done easily by opening the door 3 and pulling the media stacker 21 out.

The bottom media stacker 22 is identically constructed with a pair of right and left curved side walls 27 and 28. As a result, media M can be received from the top and the media M can be stored in a coaxial stack.

As shown in FIG. 2 and FIG. 3, a media transportation mechanism 31 is located behind the media stackers 21 and 22. The media transportation mechanism 31 has a vertical guide shaft 35 disposed vertically between the main frame 30 and the top plate 33 of the chassis 32. A transportation arm 36 is supported so that it can move up and down and rotate on the vertical guide shaft 35. The transportation arm 36 can move vertically up and down along the vertical guide shaft 35 and can pivot right and left on the vertical guide shaft 35 by means of a drive motor 37.

A first media drive 41 and a second media drive 51 are disposed one above the other at a position behind and beside media stacker 21, media stacker 22, and the media transportation mechanism 31. These two media drives 41 and 51 each have a media tray 41a, 51a, respectively, that can move between a data writing position for recording data to media, and a media transfer position where the media can be loaded and unloaded.

The label printer 11 also has a media tray 45 that can move between a printing position for printing a label on the label side of the media M, and a media transfer position for loading and unloading the media M.

FIG. 3 shows the media trays of the first media drive 41 and second media drive 51 pulled forward to the media transfer position (the position when the tray is open), and the media tray 45 of the label printer 11 therebelow pulled forward to the media transfer position.

The label printer 11 is an inkjet printer that uses color ink cartridges 12 (for the six colors black, cyan, magenta, yellow, light cyan, and light magenta, for example) as the ink supply mechanism 60. The ink cartridges 12 are installed from the front to the individual cartridge holders 13 of the cartridge carrier unit 14.

A space enabling the transportation arm 36 of the media transportation mechanism 31 to move up and down is formed between the pair of right and left side walls 24 and 25 of the one media stacker 21 and between the pair of right and left side walls 27 and 28 of the other media stacker 22. A space is also formed between the top and bottom media stackers 21 and 22 so that the transportation arm 36 of the media transportation mechanism 31 can pivot horizontally for positioning directly above the bottom media stacker 22. When the media trays 41*a*, 51*a* are pushed into the first media drive 41 and second media drive 51, respectively, (when the trays are closed), the transportation arm 36 of the media transportation mechanism 31 can be lowered and can access the media tray 45 at the media transfer position.

When both media trays 41*a* and 51*a* are in the data writing position (when the trays are closed) and the media tray 45 is at the inside printing position, the transportation arm 36 of the media transportation mechanism 31 can descend below the height of the media tray 45. A guide hole through which a disc M released by the transportation arm 36 after descending to this position passes is located below the media transfer position of the printer media tray 45, and another media stacker described below (a separate media stacker) can be installed in this guide hole 65.

As shown in FIG. 2, the drawer mechanism 7 has a drawer-like tray 70 that is openable and closable disposed below the main frame 30 so that the drawer tray 70 can can be pulled out from the main frame 30 and opened or slid into the main frame 30 and closed. The drawer tray 70 has a recess in which a media stacker unit 71 can store the media M. When this drawer tray 70 is in the stored (closed) position, the media stacker unit 71 is positioned below the guide hole 65, and the center of the media stacker unit 71 is positioned with the center of the media stacker unit 71 coaxial to the center axis of the media trays 41*a* and 51*a* and the printer media tray 45 in the media transfer position. This media stacker unit 71 accepts media M guided thereinto by the guide hole 65, and stores a relatively small number of media M (such as 5 to 10). The media stacker unit 71 accepts the media M from the top and stores the media M stacked coaxially.

Another media stacker 72 (removable media stacker) that can hold more media M than the media stacker unit 71 can be removably installed in the guide hole 65 and the media stacker unit 71 of the drawer tray 70 in the storage position (see FIG. 2). This media stacker 72 also has two curved side walls 73 and 74, and the media stacker 72 can thereby receive media M from the top and can store a plurality of media M (such as 50) in a coaxial stack. A gap enabling the transportation arm 36 of the media transportation mechanism 31 to move up and down is also formed between the pair of curved side walls 73 and 74. A handle 75 that is held by the user when installing and removing the media stacker 72 is disposed at the top part of the one side wall 74.

When the media stacker 72 is installed, a blank disc M can be picked from the media stacker 22, the disc can be recorded and printed by one of the media drives 41 and 51 and the label printer 11, and the disc can then be stored in the media stacker 72.

For example, when the top media stacker 21 and the bottom media stacker 22 are each loaded to the maximum capacity (50 discs+50 discs in this embodiment of the invention) with blank media M, all media M (50) in the bottom media stacker 22 are sequentially processed and stored in the media stacker 72. Next, all media M (50) in the top media stacker 21 are sequentially processed and stored in the emptied bottom media stacker 22. This enables processing the maximum number of media M (50+50) that can be loaded in the top media stacker 21 and the bottom media stacker 22 in a single operation (the "batch processing mode").

When the media stacker media stacker 72 has been removed, a blank disc M can be removed from the top media stacker 21 or the bottom media stacker 22, and data can be recorded and a label can be printed by the first media drive 41 or second media drive 51 and the label printer 11. The completed disc can then be stored in the media stacker unit 71 of the drawer tray 70 in the stored (closed) position.

The completed media M can thus be removed from the media stacker unit 71 by pulling the drawer tray 70 out. More specifically, completed media M can be sequentially removed one by one or plural discs at a time while processing other media M continues with the access door 3 remaining closed. This is also referred to herein as the "external discharge mode."

It should be noted that the media M can be conveyed appropriately between the media stacker 21, the media stacker 22, the media stacker unit 71 (or the media stacker 72) of the drawer tray 70, the media tray 41*a* or 51*a* of the respective media drive 41 and 51, and the media tray 45 of the label printer 11, by appropriately combining the vertical travel and horizontal pivoting operations of the transportation arm 36 of the media transportation mechanism 31.

The internal processes of the media processing device are described next.

Figure 4:
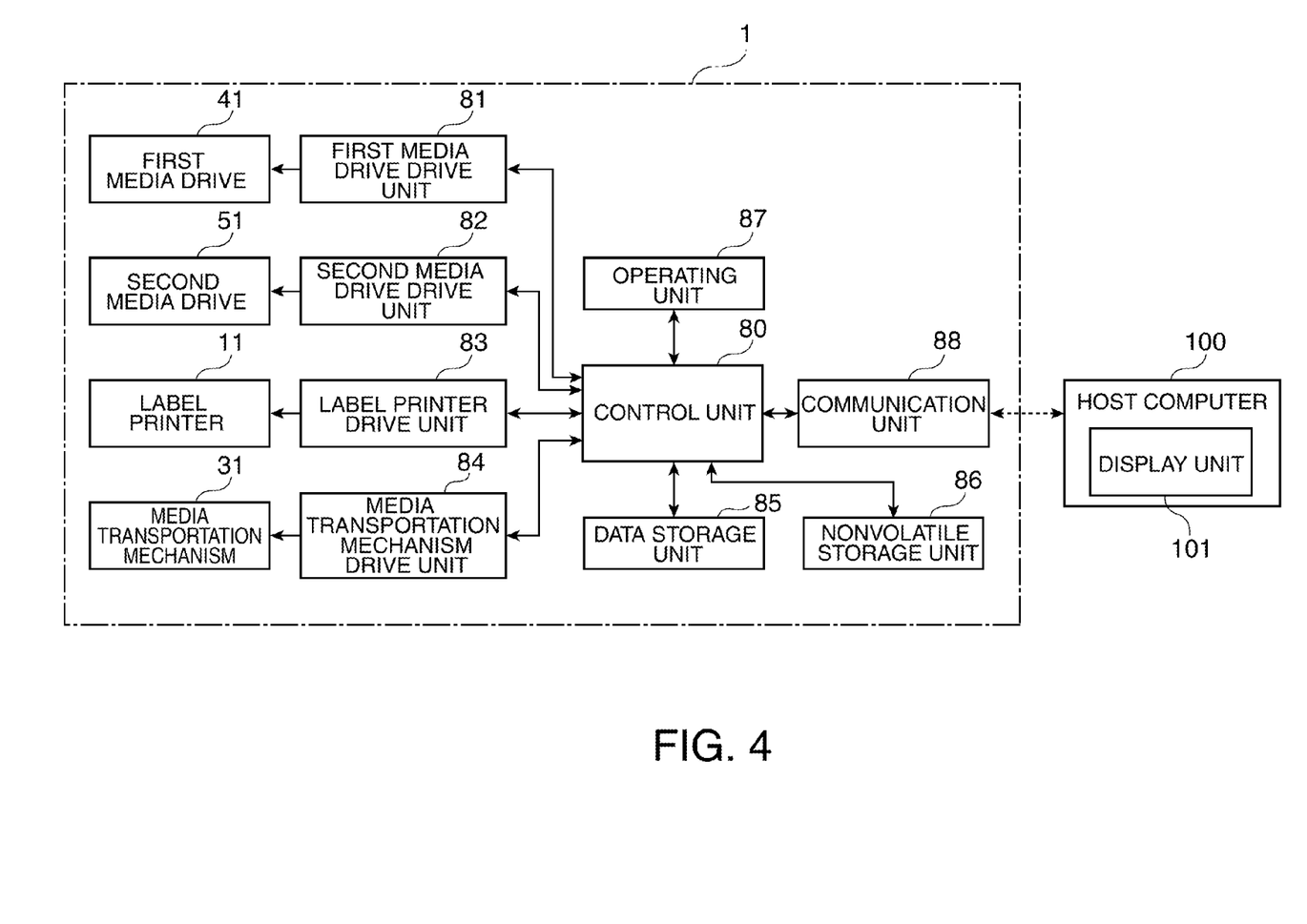
FIG. 4 is a function block diagram showing the functions of the media processing device.
Figure 5:
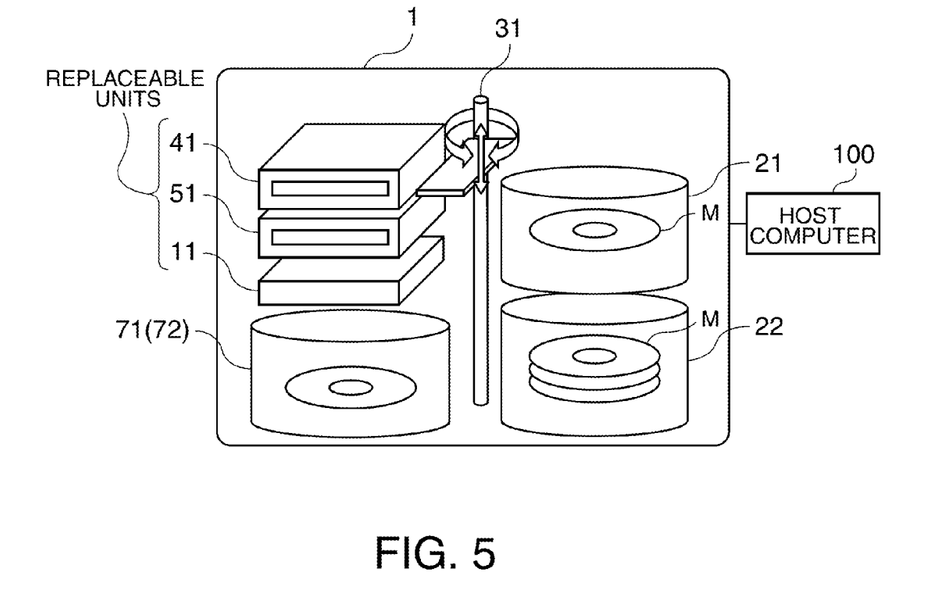
FIG. 5 schematically shows the structure of the media processing device and the replacement units therein.

FIG. 4 is a function block diagram showing the functions of the media processing device. FIG. 5 schematically shows the structure of the replaceable units in the media processing device.

As shown in FIG. 4, the media processing device 1 has a control unit 80 that controls the other parts of the media processing device, and controls the first media drive drive unit 81, the second media drive drive unit 82, the label printer drive unit 83, and the media transportation mechanism drive unit 84 inside the media processing device 1.

The first media drive drive unit 81 controls driving the first media drive 41 according to instructions from the control unit 80.

The second media drive drive unit 82 controls driving the second media drive 51 according to instructions from the control unit 80.

The second media drive drive unit 82 controls driving the label printer 11 according to instructions from the control unit 80.

The media transportation mechanism drive unit 84 controls driving the media transportation mechanism 31 according to instructions from the control unit 80.

It should be noted that in FIG. 4 the first media drive 41 or second media drive 51, the label printer 11, and the media transportation mechanism 31 are all controlled by a single control unit 80, but a configuration in which a separate control unit and communication unit are provided for each is also conceivable.

The media processing device 1 also has a data storage unit 85 for temporarily storing the data to be written to the media and the image data to be printed on the label side of the media M, a nonvolatile storage unit 86 that stores the maintenance counter information, an operating unit 87, and a communication unit 88 for communicating with a host computer 100. The operating unit 87 includes, for example, an alphanumeric keypad, a group of function keys, and a group of indicators such as status display indicators.

Volatile memory, such as RAM (random access memory), is used as the data storage unit 85.

Nonvolatile memory such as EEPROM or flash ROM is used as the nonvolatile storage unit 86 (nonvolatile memory) so that the data can be overwritten.

The communication unit 88 and the host computer 100 are connected by a dedicated communication line or a general purpose communication line.

FIG. 5 schematically shows the configuration of the replaceable units 41, 51, and 11 in this simplified view of the media processing device. The first media drive 41, the second media drive 51, and the label printer 11 are used by way of example below as units that can be individually replaced before the service life (that is, the time for which operation can be assured) of the media processing device 1 itself is reached.

The control unit 80 normally executes a media production operation (a data writing process and a label printing process) based on commands supplied from a host computer 100. When the data to be written to the media and image data for printing a label is sent from the host computer 100 to the communication unit 88, the control unit 80 first stores the data in the data storage unit 85.

The control unit 80 then controls sequentially driving the media transportation mechanism drive unit 84 and the first media drive drive unit 81 or second media drive drive unit 82, and picks up a blank disc M from media stacker 21 or 22 shown in FIG. 3 and FIG. 5.

The first media drive 41 or second media drive 51 then opens the corresponding media tray 41*a* or media tray 51*a* to receive the disc M, closes the tray after a disc M is placed thereon (moves the tray to the data writing position), and processes writing the data stored in the data storage unit 85 to the disc M. At this time the control unit 80 counts the number of times the media tray 41*a* or media tray 51*a* opens and closes, identifies the type of media M, and counts the time of the writing process for each media type.

The media type refers to the type of media for which a different head is used by the media drive, such as CD, DVD, and BD media.

After the data writing process ends, the control unit 80 controls sequentially driving the first media drive drive unit 81 or second media drive drive unit 82 and the media transportation mechanism drive unit 84. As a result, the appropriate media tray (media tray 41*a* or media tray 51*a*) is opened, the media M is picked up, the media tray (media tray 41*a* or media tray 51*a*) is closed, the disc M is conveyed to and placed on the media tray 45 positioned to the forward media transfer position, and the media tray 45 is then moved to the inside printing position. At this time the control unit 80 counts how many times the media tray 41*a* or media tray 51*a* opens and closes.

The control unit 80 then controls driving the label printer drive unit 83, and causes the label printer 11 to print the image data stored in the data storage unit 85 on the label side of the media M. At this time the control unit 80 counts the number of discs printed.

After the printing process ends, the control unit 80 controls driving the media transportation mechanism drive unit 84 and conveys the printed disc M to a specific media stacker (22 or 71 (72)) by means of the media transportation mechanism 31 after the printing process is completed.

A storage area for the maintenance counter information of the media processing device 1 is provided in the nonvolatile storage unit 86. The product serial number, the cumulative media tray open/close count and the cumulative data writing time for each media type for each media drive 41 and 51, and the cumulative print count of the label printer 11, are stored in this storage area. Other data may also be stored.

The control unit 80 has a function for adding the open/close count of each media tray, the data writing time for each media type, and the print count that were counted as described above when controlling driving each drive unit (the first media drive drive unit 81, second media drive drive unit 82, label printer drive unit 83, and media transportation mechanism drive unit 84) of the media processing device 1, and updating the maintenance counter information accordingly.

For example, the control unit 80 writes the total open/close count of the media tray (41*a*, 51*a*) of the 41 and 51, the total data writing time of the first media drive 41 and the second media drive 51 for each identified media type, and the total print count of the label printer 11, to separate storage areas (separate addresses) in the nonvolatile storage unit 86 as described below.

For brevity, CD and DVD media are used as examples of the media types below.

Furthermore, note that all types of CD media, including CD-R, CD-RW, CD-ROM, and audio CD are identified as "CD" media below, and all types of DVD media, including DVD-ROM, DVD-R, and DVD-RAM, are identified as "DVD" media.

(1) The total open/close count of the media tray 41*a* of the first media drive 41 is written to a first storage area in the nonvolatile storage unit 86.

(2) The total open/close count of the media tray 51*a* of the second media drive 51 is written to a second storage area in the nonvolatile storage unit 86.

(3) The cumulative CD writing time (unit: seconds) of the first media drive 41 is written to a third storage area in the nonvolatile storage unit 86.

(4) The cumulative CD writing time (unit: seconds) of the second media drive 51 is written to a fourth storage area in the nonvolatile storage unit 86.

(5) The cumulative DVD writing time (unit: seconds) of the first media drive 41 is written to a fifth storage area in the nonvolatile storage unit 86.

(6) The cumulative DVD writing time (unit: seconds) of the second media drive 51 is written to a sixth storage area in the nonvolatile storage unit 86.

(7) The total print count of the label printer 11 is written to a seventh storage area in the nonvolatile storage unit 86.

Note that the product serial number is previously written (such as prior to factory shipping) to an eighth storage area in the nonvolatile storage unit 86.

The life of each replaceable unit is determined by the life of the individual parts of the replaceable unit. Therefore, when a certain part has reached the end of its service life, the complete replaceable unit must be replaced during maintenance. The overall service life of a media drive is generally primarily limited by the life of the data writing head unit (the component including the optical pickup and laser beam generator) used in the media drive. Because lasers of different wavelengths are used to write CD and DVD media, the media drive has plural head units. Because the total write time to CD media and the total write time to DVD media are counted separately, the media drive must be replaced when either head unit reaches the end of its service life based on the time that each head unit is used. Wear of mechanical parts must also be considered when determining the service life of the media drive, and the media drive must also be replaced when the number of times the media tray is opened and closed exceeds the assured open/close count (the upper limit at which durability is assured).

Replacing the media drive, which is a replaceable unit, is therefore necessary when any one of the assured open/close count of the media tray (the upper limit at which durability is assured), the assured CD writing time (the upper limit at which durability is assured), and the assured DVD writing time (the upper limit at which durability is assured), is exceeded.

Note that the foregoing assured times and counts are values that are preset according to the media processing device 1, and are stored in a storage unit in the host computer 100 so that they can be referenced by the expected service life value display program.

Figure 6:
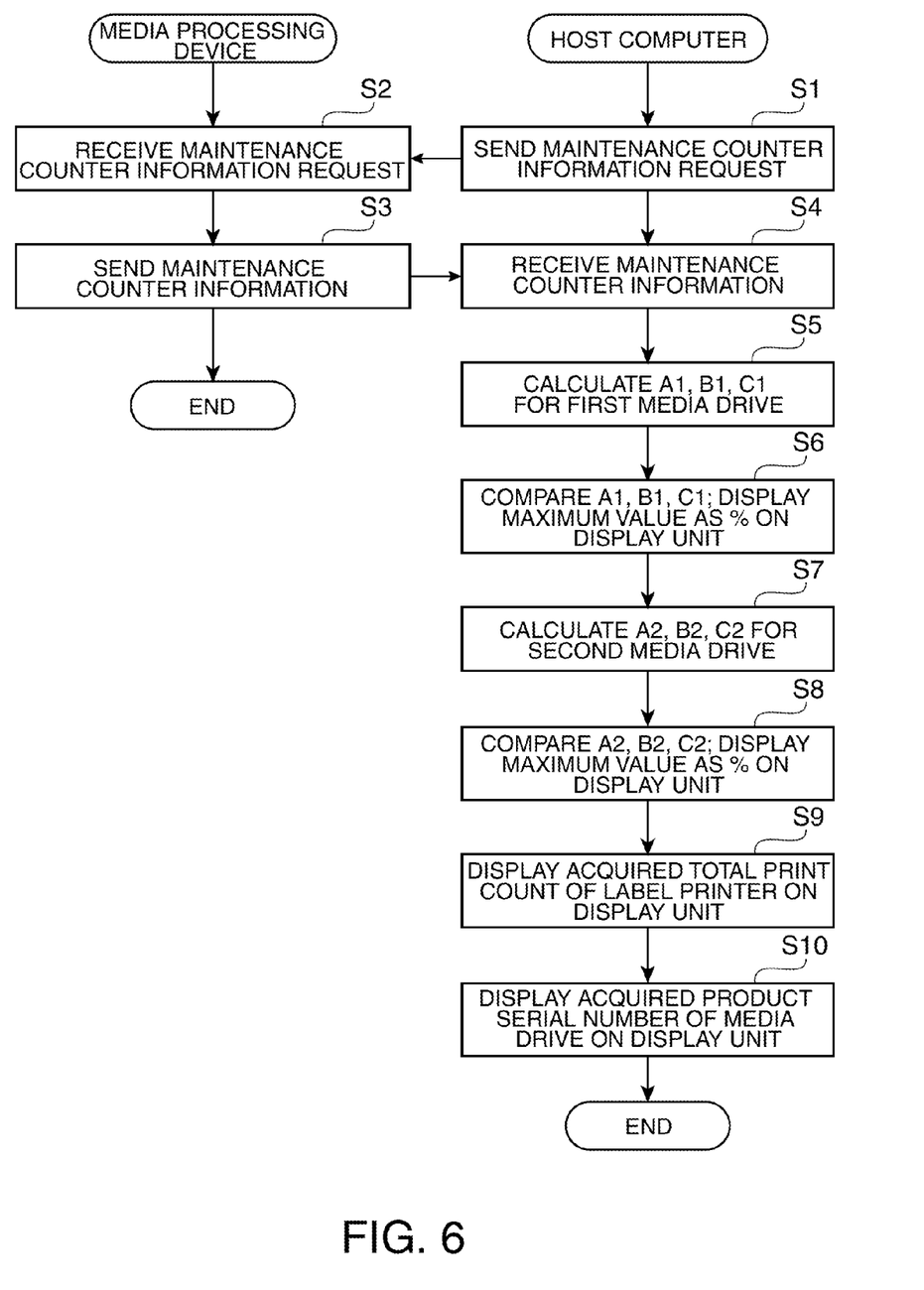
FIG. 6 is a flow chart showing the steps in the display method for displaying the expected service life values for each replacement unit.

The steps in a method of displaying expected service life values for each replacement unit of an electronic device are described next. FIG. 6 is a flow chart showing the steps in this method of displaying expected service life values for each replacement unit.

The host computer 100 connected to the media processing device 1 starts the expected service life value display program and sends a request for maintenance counter information to the media processing device 1 (step S1).

When the media processing device 1 receives the request for maintenance counter information (step S2), the control unit 80 sends the maintenance counter information from each storage area (such as the above first storage area to the eighth storage area) of the nonvolatile storage unit 86 to the host computer 100 (step S3).

The host computer 100 then receives the maintenance counter information (step S4), and based on the preset assured media tray open/close count, the assured CD writing time, the assured DVD writing time, and the acquired maintenance counter information, calculates the following values A1, B1, C1 for the first media drive 41 (step S5).

$A1$=[the total open/close count of the media tray 41*a* of the first media drive 41 (from the first storage area)]/[the assured media tray open/close count (the upper limit at which durability is assured)]

$B1$=[the cumulative CD writing time of the first media drive 41 (from the third storage area)]/[the assured CD writing time (the upper limit at which durability is assured)]

$C1$=[the cumulative DVD writing time (unit: seconds) of the first media drive 41 (from the fifth storage area)]/[the assured DVD writing time (the upper limit at which durability is assured)]

The host computer 100 then compares values A1, B1, and C1, and displays the result as a percentage (%) of the maximum value on the display unit 101 (step S6). For example, if A1=0.1, B1=0.2, and C1=0.15, B1 is the maximum value, and converted to a percentage to display an expected service life value of 20%.

The following values A2, B2, and C2 are similarly obtained for the second media drive 51 (step S7).

$A2$=[the total open/close count of the media tray 51*a* of the second media drive 51 (from the second storage area)]/[the assured media tray open/close count (the upper limit at which durability is assured)]

$B2$=[the cumulative CD writing time of the second media drive 51 (from the fourth storage area)]/[the assured CD writing time (the upper limit at which durability is assured)]

$C2$=[the cumulative DVD writing time of the second media drive 51 (from the sixth storage area)]/[the assured DVD writing time (the upper limit at which durability is assured)]

The host computer 100 then compares values A2, B2, and C2, and displays the result as a percentage (%) of the maximum value on the display unit 101 (step S8). For example, if A2=0.1, B2=0.1, and C1=0.15, C2 is the maximum value, and converted to a percentage to display an expected service life value of 15%.

By thus displaying the expected service life value as a percentage, the user reading the display can easily know approximately how much service life remains until the corresponding unit needs replacing.

Note that values exceeding 100% may be displayed as 100%.

The acquired total print count of the label printer 11 (from the seventh storage area) is also displayed on the display unit 101 (step S9).

The acquired product serial number of the media processing device 1 (from the eighth storage area) is also displayed on the display unit 101 (step S10). By displaying the product serial number, which media processing device 1 is connected can be checked when a single host computer 100 is used by reconnecting it to a plurality of media processing devices 1.

Figure 7:
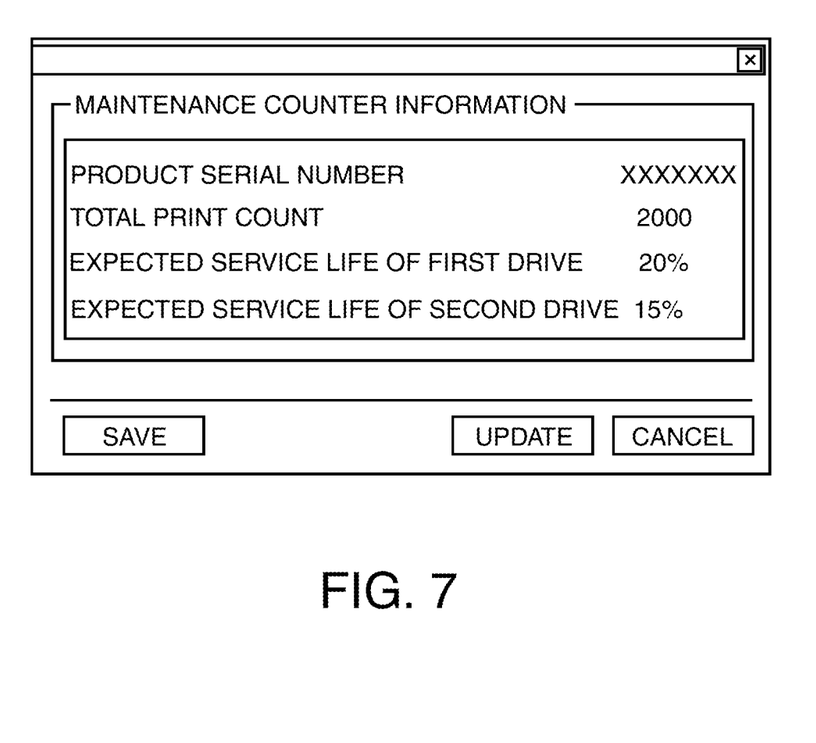
FIG. 7 shows a sample display of the expected service life values for individual replacement units in the media processing device.

FIG. 7 shows a sample display of the expected service life values for individual replaceable units of the media processing device. In FIG. 7, the product serial number of the media processing device 1, the total print count of the label printer 11, the expected service life of the first media drive 41, and the expected service life of the second media drive 51 are displayed on the display unit 101.

Note that because the service life of the label printer 11 is often displayed in a common printer as the number of media printed, the cumulative print count is displayed in this example, but the service life may also be displayed as a percentage equal to the total print count divided by the maximum print count at which printer durability is assured, for example.

The numeric values of the maintenance counter information displayed as shown in FIG. 7 can also be saved as a file in the host computer by pressing the "save" button, for example. By pressing the "update" button, the maintenance counter information can also be acquired again. The display can also be cleared by pressing the "cancel" button.

The media processing device 1 (electronic device) according to this embodiment of the invention is described as having two media drives, first media drive 41 and second media drive 51, but may have only one or three or more media drives.

As described above, by starting and executing the expected service life value display program of the host computer 100 connected to the media processing device 1 (electronic device), the method of displaying expected service life values according to the invention displays expected service life values compiled for each replaceable unit of the media processing device 1, such as the expected life of the first media drive 41, the expected life of the second media drive 51, and the total print count of the label printer 11, on a display unit 101. As a result, the user can easily know the expected replacement time (expected service life) of each replaceable unit by simply referring to the expected service life values displayed on the display unit 101.

Although the present invention has been described in connection with preferred embodiments thereof with reference to the accompanying drawings, it is to be noted that various changes and modifications will be apparent to those skilled in the art in light of the present disclosure. Any such change or modification is intended to be included within the scope of the present invention to the extent it falls within any of the claims of this application.

What is claimed is:

1. An expected service life value display method for displaying an expected service life value for each replaceable unit in media processing device having at least one media drive and a label printer as replaceable units, the method comprising:
  executing by a host computer in communication with the electronic device the steps of:
    acquiring maintenance counter information that is stored in the media processing device and includes a cumulative usage time related to a head of the media drive used with media of a specific type;
    acquiring a total print count of the label printer;
    calculating the (cumulative usage time/assured time) as the expected service life value for each head based on the acquired maintenance counter information and an assured time that is preset for each head used with media of the specific type; and
    displaying the maximum value of the expected service life value calculated for each head on a display unit as the expected service life of the media drive, and displaying (the total print count)/(a maximum print count to which printer durability is assured) as the expected service life value of the label printer on the display unit.

2. The expected service life value display method described in claim 1, wherein:
  the maintenance counter information includes a cumulative opening/closing count for a media tray of the media drive, and
  the host computer further executes the steps of:
    calculating the (cumulative count)/(assured time) as the expected service life value for opening and closing the media tray based on the acquired maintenance counter information and an assured time that is preset for opening and closing the media tray; and
    displaying the maximum value of the expected service life values calculated for the heads and the expected service life value for opening and closing the media tray on a display unit as the expected service life of the media drive.

3. The expected service life value display method described in claim 1, wherein the media processing device comprises a plurality of media drives, and the host computer further executes the steps of:
  acquiring expected service life values for each of the plural media drives; and
  displaying the expected service life value for each media drive on the display unit.

4. The expected service life value display method described in claim 1, wherein
  the media processing device further comprises
    a media storage unit that stores the media; and
    a media transportation mechanism that can convey the media to the media drive, the label printer, and the media storage unit.

5. The expected service life value display method described in claim 1, wherein:
  the media of a specific type is a CD, DVD, or BD medium.

6. A tangible computer readable medium containing executable instructions for carrying out the method of claim 1.

* * * * *